United States Patent
Scott et al.

(10) Patent No.: US 10,860,610 B1
(45) Date of Patent: Dec. 8, 2020

(54) METHOD AND SYSTEM FOR AUTOMATICALLY IDENTIFYING AND RECOVERING STORAGE OBJECTS

(71) Applicant: EMC Corporation, Hopkinton, MA (US)

(72) Inventors: Derek M. Scott, Raleigh, NC (US); Gajanan S. Natu, Cary, NC (US); Michael L. Burriss, Raleigh, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 378 days.

(21) Appl. No.: 15/198,321

(22) Filed: Jun. 30, 2016

(51) Int. Cl.
*G06F 16/27* (2019.01)

(52) U.S. Cl.
CPC .......... *G06F 16/273* (2019.01); *G06F 16/275* (2019.01)

(58) Field of Classification Search
CPC .............................. G06F 16/273; G06F 16/275
See application file for complete search history.

(56) References Cited

U.S. PATENT DOCUMENTS

| | | | |
|---|---|---|---|
| 8,140,821 B1 | 3/2012 | Raizen et al. | |
| 8,156,306 B1 | 4/2012 | Raizen et al. | |
| 8,185,505 B1 * | 5/2012 | Blitzer | G06F 11/1471 707/610 |
| 8,332,612 B1 | 12/2012 | Raizen et al. | |
| 9,323,655 B1 | 4/2016 | Sahin et al. | |
| 2012/0005154 A1 * | 1/2012 | George | G06F 17/30578 707/607 |
| 2012/0254130 A1 * | 10/2012 | Mitra | G06F 16/13 707/690 |
| 2016/0011944 A1 * | 1/2016 | Jain | G06F 11/1402 707/674 |
| 2016/0188621 A1 * | 6/2016 | Karinta | G06F 11/1451 707/827 |

* cited by examiner

*Primary Examiner* — James Trujillo
*Assistant Examiner* — Kurt A Mueller
(74) *Attorney, Agent, or Firm* — BainwoodHuang

(57) ABSTRACT

Systems and methods are disclosed for automatically identifying and recovering storage objects. A storage system includes a plurality of storage objects associated with storage resources in communication with the storage system, and a storage processor. The storage processor initiates a recovery process in response to a first state of the storage processor and determines a status for each of the plurality of storage objects. The storage processor identifies one or more storage objects requiring recovery based on the status of each of the storage objects and determines a first storage object to recover based on a predetermined hierarchy of storage objects. The predetermined hierarchy is based on a dependency between one or more of the storage objects. The storage processor determines a recovery operation to recover the first storage object and initiates the recovery operation on the first storage object.

24 Claims, 4 Drawing Sheets

METHOD AND SYSTEM FOR AUTOMATICALLY IDENTIFYING AND RECOVERING STORAGE OBJECTS

FIELD OF THE TECHNOLOGY

The present technology relates generally to data storage systems and, more specifically, to automatic identification and recovery of storage objects in storage systems.

BACKGROUND

In some applications, a storage system can include a storage processor for managing logical relationships between storage devices connected to the storage system, and for controlling I/O operations with the storage devices. Examples of such storage systems include the storage systems produced by EMC Corporation of Massachusetts. In some cases, I/O operations initiated by the storage processor fail to reach the storage devices due to, for example, a displaced data or power cable (e.g., a cable has been kicked out), a reboot of the backend storage system, disk failure, or disk corruption. Conventional storage systems can include processes for recovering from I/O operation fails at the storage system caused by disk failures or user data corruption. However, conventional approaches for recovering from failure modes associated with corruption or loss of internal metadata related to the logical mapping of the storage system physical and logical objects typically require a service call and intervention by a technician who must physically service the storage system to regenerate the internal metadata.

SUMMARY OF THE TECHNOLOGY

Accordingly, there is a need for a method and system for automatically identifying and recovering storage objects.

The invention, in one aspect, features a storage system including a plurality of storage objects associated with storage resources in communication with the storage system. The storage is processor configured to initiate a recovery process in response to a first state of the storage processor. The storage processor is further configured to determine a status for each of the plurality of storage objects. The storage processor is further configured to identify one or more of the plurality of storage objects requiring recovery based on the status of each of the plurality of storage objects. The storage processor is further configured to determine a first storage object of the one or more storage objects requiring recovery to recover based on a predetermined hierarchy of storage objects. The predetermined hierarchy is based on a dependency between one or more of the storage objects. The storage processor is further configured to determine a recovery operation to recover the first storage object based on one or more of a status of the first storage object, a type of the first storage object, and a dependency between the first storage object and at least one of the plurality of storage objects. The storage processor is further configured to initiate the recovery operation on the first storage object.

The invention, in another aspect, features a computer-implemented method executed on a storage processor of a storage system for automatically identifying and recovering storage objects. The storage processor initiates a recovery process for a storage object in response to a first state of the storage processor. The storage processor determines a status for each of a plurality of storage objects associated with storage resources in communication with the storage system. The storage processor identifies one or more of the plurality of storage objects requiring recovery based on the status of each of the plurality of storage objects. The storage processor determines a first storage object of the one or more storage objects requiring recovery to recover based on a predetermined hierarchy of storage objects. The predetermined hierarchy based on a dependency between one or more of the storage objects. The storage processor determines a recovery operation to recover the first storage object based on one or more of a status of the first storage object, a type of the first storage object, and a dependency between the first storage object and at least one of the plurality of storage objects. The storage processor initiates the recovery operation on the first storage object.

The invention, in one aspect, features a storage system including a plurality of storage objects associated with storage resources in communication with the storage system. The storage is processor configured to initiate a recovery process in response to a first state of the storage processor. The storage processor is further configured to determine a status for each of the plurality of storage objects. The storage processor is further configured to identify one or more of the plurality of storage objects requiring recovery based on the status of each of the plurality of storage objects. The storage processor is further configured to determine a first storage object of the one or more storage objects requiring recovery to recover based on a predetermined hierarchy of storage objects, the predetermined hierarchy based on a dependency between one or more of the storage objects. The storage processor is further configured to determine a recovery operation to recover the first storage object based on one or more of a status of the first storage object, a type of the first storage object, and a dependency between the first storage object and at least one of the plurality of storage objects. The storage processor is further configured to initiate the recovery operation on the first storage object.

Any of the above aspects can include one or more of the following features. In some embodiments, the storage processor is further configured to monitor the status of the first storage object upon completion of the recovery operation and determine, in response to detecting a nominal status of the first storage object, a second storage object of the one or more storage objects requiring recovery to recover based on the predetermined hierarchy.

In some embodiments, the storage processor is further configured to initiate a second recovery process when it is determined that the second storage object requires recovery. The storage processor is configured to determine a second recovery operation to recover the second storage object based on one or more of a status of the second storage object, a type of the second storage object, and a dependency between the second storage object and at least one of the plurality of storage objects. The storage processor is configured to initiate the second recovery operation on the second storage object.

In some embodiments, the storage processor is further configured to monitor the status of the second storage object upon completion of the second recovery operation. The storage processor is configured to determine, in response to detecting a nominal status of the second storage object, one or more additional storage objects of the one or more storage objects requiring recovery to recover based on the predetermined hierarchy. The storage processor is configured to initiate one or more additional recovery processes when it is determined that one or more additional storage objects requires recovery.

In some embodiments, the recovery process executes asynchronously from one or more of a boot process of the storage processor, a hot plug process of the storage processor, and a discovery process of the storage processor. In some embodiments, the storage processor executes one or more of a boot process, a hot plug process, and a discovery process in the first state.

In some embodiments, the storage processor is further configured to determine a second storage object of the one or more storage objects requiring recovery to recover based on the predetermined hierarchy. The storage processor is configured to initiate a second recovery process when it is determined that the second storage object requires recovery. The storage processor is configured to determine a second recovery operation to recover the second storage object based on one or more of a status of the second storage object, a type of the second storage object, and a dependency between the second storage object and at least one of the plurality of storage objects. The storage processor is configured to initiate the recovery operation on the second storage object, wherein the first recovery process and the second recovery process execute simultaneously.

In some embodiments, the first storage object and the second storage object are at a same level of the predetermined hierarchy. In some embodiments, the storage system processor is a virtual machine.

In some embodiments, the storage processor is further configured to regenerate metadata of the first storage object during the recovery operation.

In some embodiments, the plurality of storage objects includes data related to one or more of a file share, a file system, a virtual volume, a snapshot, a logical unit number (LUN), a mapped LUN, and a storage pool.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which.

DETAILED DESCRIPTION

The technology described herein can facilitate automatically identifying and recovering storage objects.

Figure 1:
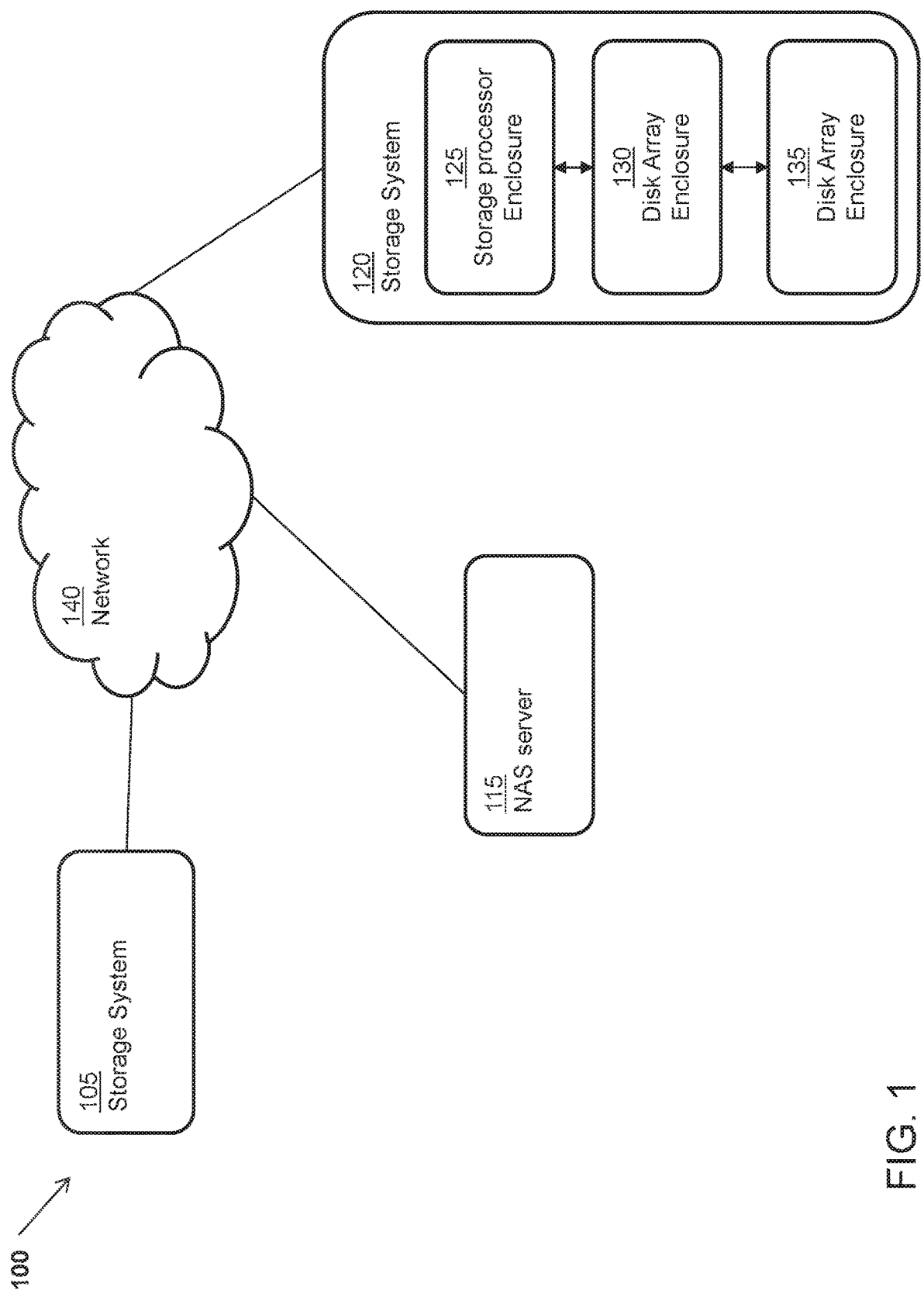
FIG. 1 depicts a system in which the technology can be implemented.

FIG. 1 depicts system 100 in which the technology can operate. System 100 includes storage system 105. Storage system 105 can be a computing device including a storage processor (not shown) for managing one or more storage resources in system 100. The storage processor can be a computing device, such as a server, blade server, etc. In general, the storage processor can service I/O requests (e.g., commands to read data from or write data to storage resources of system 100) received from a host device (not shown). In some embodiments, the storage processor is a virtual machine executing on storage system 105. In some embodiments, storage system 105 is a storage platform including storage processors and disks, similar to storage system 120 described below.

System 100 further includes systems and devices that serve as storage resources of system 100. For example, system 100 includes NAS server 115 and storage system 120. NAS 115 can be a network-attached storage server including a plurality of any form of storage device, such as magnetic disk drives, flash memory drives, SSDs, etc. Storage system 120 includes storage processor enclosure 125. Storage processor enclosure 125 can include one or more storage processors (not shown). As with storage system 105, the storage processors can be any computing devices, such as servers, blade servers, etc., or virtual machines running on such equipment. Storage system 110 includes disk array enclosure 130 and disk enclosure 135. Disk array enclosures 130 and 135 can include any form of storage devices, such as magnetic disk drives, flash memory drives, SSDs, etc. In the illustrated embodiment, storage processor enclosure 125 is connected to disk array enclosure 130, which is connected to disk array enclosure 135. The storage processors can read data from and write data to the storage devices in disk array enclosure 130 and disk array enclosure 135. Storage system 105 can be connected to NAS server 115 and storage system 120 via network 140. The illustrated connections can each be any type of connection for communicating data. In general, the storage processors in storage processor enclosure 125 can service I/O requests (e.g., commands to read data from or write data to storage system 110) received from a host device (not shown).

It should be appreciated that system 100 is an exemplary system in accordance with the technology. Other configurations are contemplated. For example, the technology described herein can be used to orchestrate recovery operations within any of storage system 105, NAS server 115, or storage system 120, as well as any aggregates composed of those components or related types of exemplary subsystems. In some embodiments, the storage processors and disk enclosures can be in the same or different enclosures. In some embodiments, more or fewer disk array enclosures can be connected to the storage processors in the storage processor enclosure.

Figure 2:
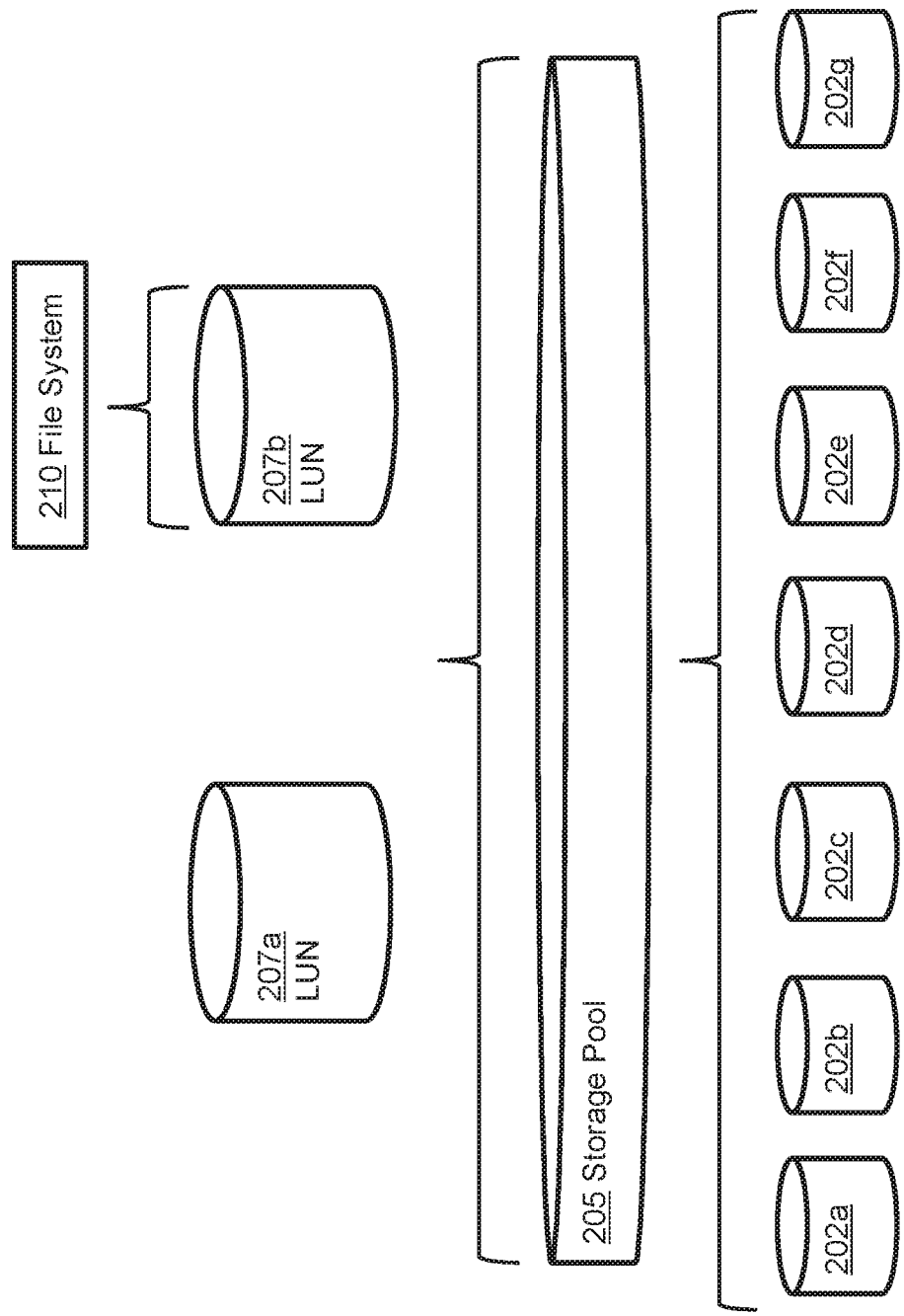
FIG. 2 depicts exemplary logical relationships between storage devices in a storage system and logical storage system objects.

FIG. 2 depicts exemplary logical relationships between storage devices 202a-202g, storage pool 205, LUNs 207a and 207b, and file system 210. The depicted logical relationships are exemplary of the hierarchy that exists among the storage objects corresponding to components of storage system 105. For example, storage devices 202a-202c can be located in NAS server 115, and storage devices 202d-202g can be located in disk array enclosure 130 and/or disk array enclosure 135 of storage system 120. The components of system 100 can include hardware, firmware, and/or software to implement the illustrated logical relationships.

As further illustrated in FIG. 2, storage pool 205 can be formed from storage devices 202a-202g. Storage devices can be any combination of physical and/or virtual storage devices (e.g., disks). For example, the storage space of one or more of storage devices 202a-202g can be added to storage pool 205, making the storage space from one or more of storage devices 202a-202g available to be provisioned from storage pool 205. LUNs 207a and 207b can be formed on storage pool 205. For example, a portion of the storage space from storage pool 205 (which in turn maps to storage space on one or more of storage devices 202a-202g) can be provisioned and/or assigned to LUN 207a and a portion of the storage space from storage pool 205 (which in turn maps to storage space on one or more of storage devices 202a-202g) can be provisioned and/or assigned to LUN 207b. Generally, storage space for the entire capacity of the LUN is provisioned at the time the LUN is created.

Moving further through the hierarchy, one or more file systems can be created on the LUNs. As shown in FIG. 2, file system 210 is created on LUN 207b. As files are created and/or modified within file system 210, data is written to storage devices 202a-202g based on the logical address mapping that is established through each storage object in the hierarchy. Storage system 105 can maintain the logical mappings between the address spaces of file system 210, LUN 207b, and storage devices 202a-202g. Likewise, storage system 105 can maintain the logical mappings between the address spaces of LUN 207a, and storage devices 202a-202g.

It should be appreciated that logical relationships illustrated in FIG. 2 are exemplary logical relationships in accordance with the technology. Other relationships are contemplated. For example, one or more additional layers of virtualization and/or abstraction can be utilized (e.g., file systems in addition to file system 210, one or more snapshots, one or more NAS servers, additional LUNs, etc.). In some embodiments, one or more virtual volumes (vVOLs) can be formed on storage pool 205. In some storage systems, a vVOL can be referred to as a logical volume and/or logical disk volume.

Storage system 105 can maintain information or internal metadata about the logical mappings between the address spaces of the logical structures of FIG. 2 and storage devices 202a-202g. In some embodiments, the internal metadata is stored locally to storage system 105 and/or is written out to storage resources of system 100 using I/O operations analogous to those used for reading and writing user data. The internal metadata can become corrupted or lost when, for example, an I/O operation writing out the internal metadata fails to complete or reach its backend storage system due to events such as power loss at the backend storage system, a reboot of the storage system, an unplugged cable, cache dirty data loss, etc. In some embodiments, a crash of storage system 105 can cause internal metadata corruption. When internal metadata is corrupted or lost, storage system 105 cannot properly reconstruct the logical mappings of the storage objects of system 100 upon events such as reboot or power cycling, and as a result, those storage objects for which the metadata is corrupted become inaccessible by subsequent I/O operations. In addition, the storage objects for which the internal metadata is corrupted can enter a recovery required state which further affects system usability. For example, this causes a "data unavailable" condition for any user data stored on those storage objects, which are no longer available for I/O operations. In some embodiments, the storage objects comprise data related to one or more of a file share, a file system, a vVOL, a snapshot, a LUN, and a storage pool.

Figure 3:
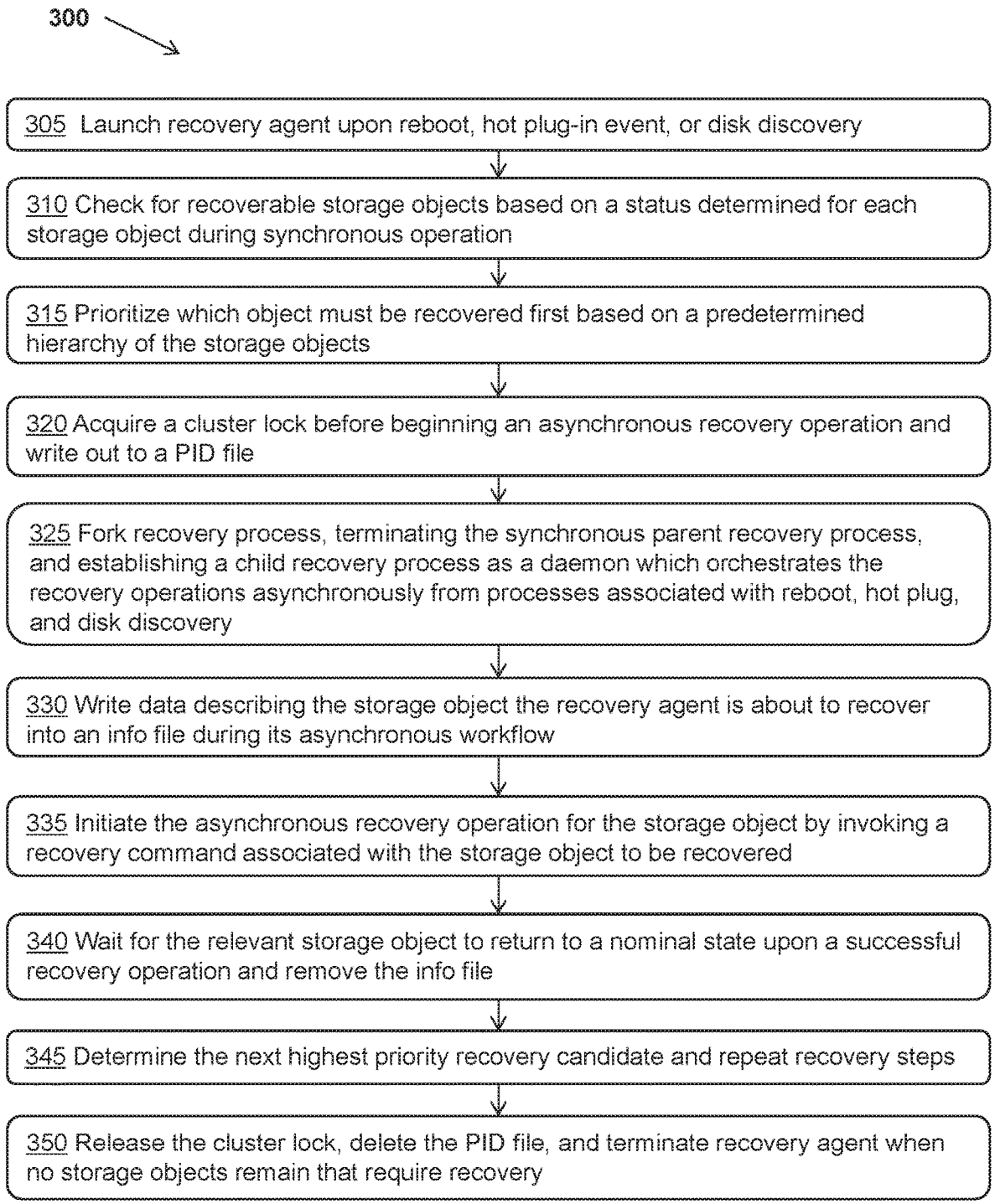
FIG. 3 depicts a flow chart illustrating a method for recovering storage objects using a recovery agent in accordance with the technology.

FIG. 3 is a flow diagram illustrating an automated process 300 for recovering storage objects using a recovery agent (e.g., recovery process) which runs as a self-terminating daemon. A recovery agent can be launched as a standalone self-terminating process when storage system 105 enters a first state of operation. For example, the recovery agent can be launched (305) upon a reboot of storage system 105, upon a "hot plug" event caused by storage system 105 determining that some storage object of system 100 has been added or removed, or during disk discovery. In particular, these events can invoke a discovery process which scans for each storage object (e.g., storage pools, LUNs, NAS file systems, NAS servers, vVols, etc.) and invokes the recovery agent to recover any storage object that is in a recovery required state.

When invoked, the recovery agent initially executes synchronously to the discovery process and other processes that have been initiated by the system event (e.g., reboot, hot plug, disk discovery). As part of its synchronous operation, the recovery agent checks (310) for recoverable storage objects based on a status determined for each storage object. In some embodiments, the recovery agent issues a command that returns a list of storage objects requiring recovery. In some embodiments, the recovery agent creates a list of storage objects requiring recovery and cross-references them with relevant metadata about the logical mappings of the storage objects in system 100 to confirm that the storage object should be recovered.

Upon confirming that one or more storage objects require recovery, the recovery agent prioritizes (315) which object must be recovered first. For example, dependencies between the different storage objects create a predetermined hierarchy that can dictate the order in which storage objects are recovered. For example, a NAS file system cannot be recovered if any of the underlying storage objects which are associated with it require recovery (e.g., its underlying NAS server requires recovery, the underlying storage pool that is formed from disks of the NAS server requires recovery, etc.). As another example, referring to the example of FIG. 2, in order to recover LUN 207a, storage pool 205 would first need to be recovered. In one embodiment of system 100, the hierarchy is prioritized from highest to lowest as: 1. Storage pools; 2. LUNs; 3. NAS server lower decks; 4. NAS server upper decks; 5. NAS file system lower decks; 6. NAS file system upper decks; and 7. vVOLs. In this example, the hierarchy includes storage objects related to the management of data services (e.g., NAS server lower decks, NAS file system lower decks) and storage objects related to a user file system (e.g., NAS server upper decks, NAS file system upper decks). In some embodiments, the storage object related to the management of data services is a LUN and the user file system is created on the LUN. It should be understood that other hierarchies can exist based on dependencies between one or more of the storage objects without departing from the spirit of the invention.

Upon identifying which storage object to recover based on the predetermined hierarchy, the recovery process forks (325) itself, terminating its parent process, and establishing a child process as a daemon which orchestrates the recovery operations asynchronously in the background, potentially continuing on past the point at which discovery terminates. Accordingly, the recovery agent performs its recovery operations without blocking other processes running on storage server 105 associated with reboot, hot plug, and/or disk discovery. In this way, any long-running recovery operations that may be required can run their course without backing up discovery operations. This allows other storage objects to be brought up to a fully operational state while the recovery agent performs recovery operations on other storage objects. The data unavailable time of system 100 is decreased because recovery of a single storage object does not cause the entirety of system 100's storage to be unavailable. As an example, if LUN 207a of FIG. 2 required recovery, any data contained in storage mapped to LUN 207a would be unavailable while the recovery agent performed recovery operations. However, data contained in storage mapped to LUN 207b would be available as soon as the system reached an online state since the recovery agent executes asynchronously from the other processes executing on storage system 105.

In some embodiments, the recovery process attempts to acquire (320) a cluster lock before beginning an asynchronous recovery operation. For example, as described above, storage server 105 can include a storage processor that is a virtual machine, and in some such embodiments, storage system 105 can include two storage processors. Accordingly, it is possible for each storage processor to be running a separate recovery agent that will attempt to initiate an asynchronous recovery operation for one of its associated storage objects. Because asynchronous recovery operations can be I/O- and processor-intensive when extensive regeneration of metadata is required, the recovery agent is required to acquire a cluster lock before beginning so that only one recovery agent is in its asynchronous recovery state at one time. This can reduce system congestion that would otherwise occur due to two processes vying for a limited amount of concurrently-available I/O resources. In embodiments requiring the recovery agent to acquire a cluster lock, upon acquiring the cluster lock, the recovery agent writes out to a PID file before transitioning to its asynchronous workflow. The PID file is accessible to all recovery agents operating on storage system 105. Accordingly, if a recovery agent determines that the PID file exists, it terminates immediately without doing any more work because it knows that another recovery agent is already running.

In some embodiments, concurrent asynchronous recovery operations initiated by disparate storage processors running on a storage system are permitted. In some embodiments, concurrent recovery operations are executed by the same storage processor for storage objects at the same level of the hierarchy of storage objects. For example, in such embodiments, LUNs 207a and 207b can be recovered simultaneously because there is no dependency relationship between them.

The recovery agent writes (330) data describing the storage object it is about to recover into an info file during its asynchronous workflow. The purpose of the info file is to allow the recovery agent to recognize when a running recovery session (e.g., after a reboot) is one that was started by the recovery agent (versus a manual recovery operation initiated by TCE engineer). For example, during its synchronous operation, if the recovery agent determines that there is no PID file but an info file exists, the recovery agent skips to its asynchronous workflow to monitor and complete this pre-existing recovery operation before looking for another one to start.

The recovery agent initiates (335) the asynchronous recovery operation for the storage object by invoking a recovery command associated with the storage object to be recovered. In some embodiments, each type of storage object has a separate recovery command associated with it. In some embodiments, the recovery command can be invoked with particular options according to the type of the storage object type, the status of the storage object, or a dependency between the storage object and another storage object in system 100.

After initiating the recovery operation, the recovery agent waits (340) for the relevant storage object to return to a nominal state upon a successful recovery operation. In some embodiments, the recovery agent invokes a command to complete the recovery operation and return the recovered object to its nominal state. Upon successful completion of a recovery operation, the agent removes the info file to indicate that a recovery operation is no longer executing.

The recovery agent then determines (345) the next highest priority recovery candidate and loops through the steps described above again, continuing until there aren't any recoverable storage objects that it hasn't tried to recover. When that happens, the recovery agent releases (350) the cluster lock, deletes the PID file, and terminates. Accordingly, the recovery agent runs until it has no more work to do, and then terminates.

Using the method described above, the recovery agent can be restarted from any possible point of interruption. For example, the recovery agent can resume recovery operations automatically at boot time by use of the PID and info files as described above.

Figure 4:
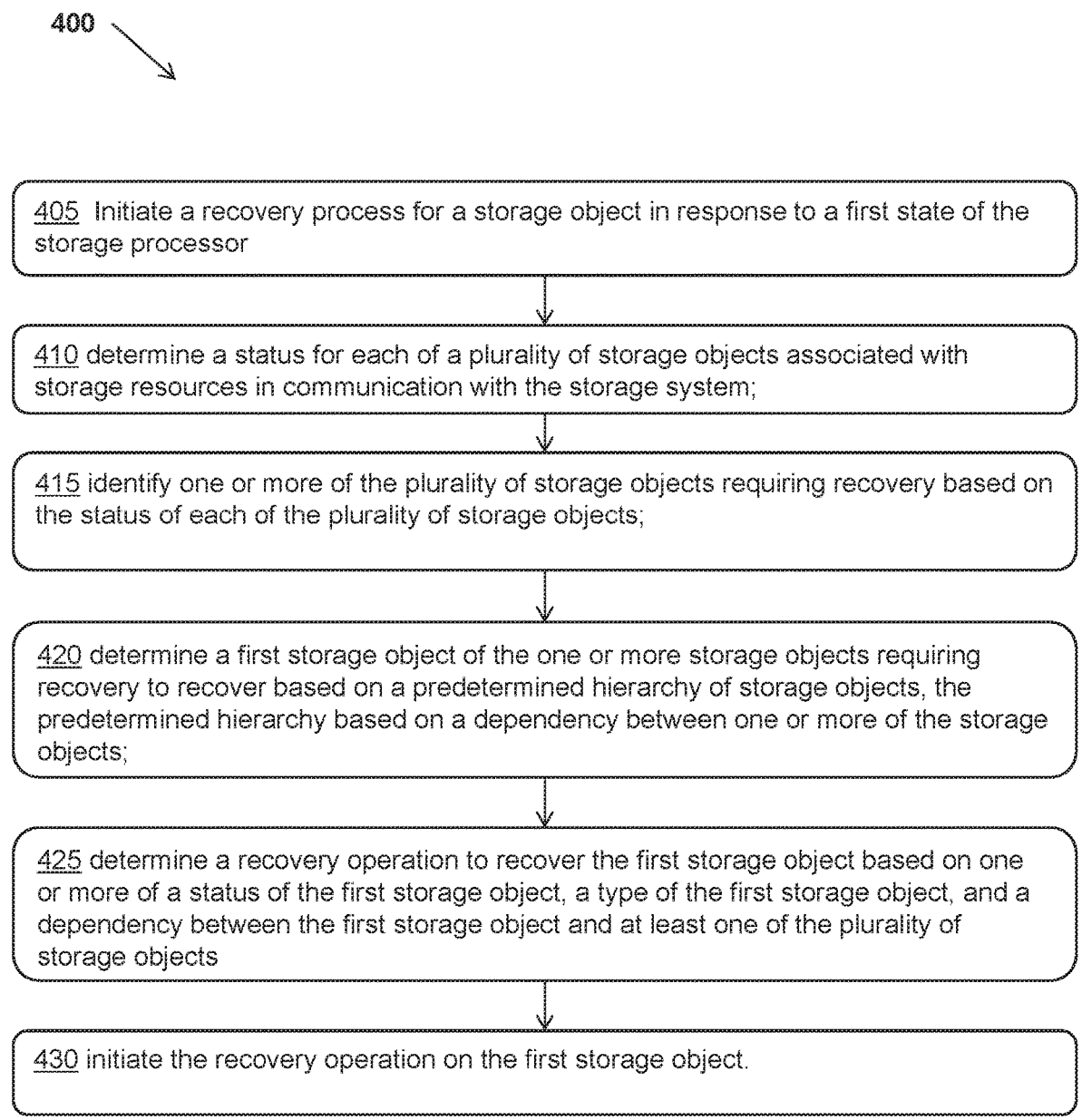
FIG. 4 depicts a flow chart illustrating a method for recovering storage objects using a recovery agent in accordance with the technology.

FIG. 4 depicts a flow chart illustrating a method 400 for recovering storage objects using a recovery agent in accordance with the technology. The method illustrated in FIG. 4 can be executed by, for example, storage system 105. At step 405, the storage processor can initiate a recovery process for a storage object in response to a first state of the storage processor. For example, the recovery agent can be launched during the discovery process as described above when storage system 105 is executing a reboot, hot swap-in, or disk discovery. At step 410, the storage processor can determine a status for each of a plurality of storage objects associated with storage resources in communication with the storage system. As described above, the storage processor can scan the storage objects for their status during discovery.

At step 415, the storage processor identifies one or more of the plurality of storage objects requiring recovery based on the status of each of the plurality of storage objects. For example, the storage processor can initiate a command to determine a list of storage objects requiring recovery, as described above related to FIG. 3. At step 420, the storage processor determines a first storage object of the one or more storage objects requiring recovery to recover based on a predetermined hierarchy of storage objects, the predetermined hierarchy based on a dependency between one or more of the storage objects. As described above, storage objects must be recovered in a certain order according to dependencies between them, and the storage processor prioritizes which object must be recovered first based on the dependencies.

At step 425, the storage processor determines a recovery operation to recover the first storage object based on one or more of a status of the first storage object, a type of the first storage object, and a dependency between the first storage object and at least one of the plurality of storage objects. At step 430 the storage processor initiates the recovery operation on the first storage object. The storage processor can invoke a recovery command associated with the storage object to be recovered, as described above.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the technology by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of a computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Hypertext Transfer Protocol (HTTP), Session Initiation Protocol (SIP), a Global System for Mobile Communications (GSM) protocol, Universal Mobile Telecommunications System (UMTS), 3GPP Long Term Evolution (LTE) and/or other communication protocols.

Devices of a computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device includes, for example, a Blackberry® from Research in Motion, an iPhone® from Apple Corporation, and/or an Android™-based device.

Comprise, include, and/or plural forms of each are open ended and include the listed parts and can include additional parts that are not listed. And/or is open ended and includes one or more of the listed parts and combinations of the listed parts.

One skilled in the art will realize the technology may be embodied in other specific forms without departing from the spirit or essential characteristics thereof. The foregoing embodiments are therefore to be considered in all respects illustrative rather than limiting of the technology described herein.

What is claimed is:

1. A storage system comprising:
 a plurality of storage objects associated with storage resources in communication with the storage system; and
 a storage processor configured to:
  initiate a recovery process in response to a first state of the storage processor;

determine a status for each of the plurality of storage objects;

identify storage objects from among the plurality of storage objects as requiring recovery based on the status of each of the plurality of storage objects, the identified storage objects including at least a first storage object and a second storage object;

determine a hierarchy of at least some of the identified storage objects to obtain an order in which respective storage objects in the hierarchy are to be recovered, the hierarchy being based on one or more dependencies between the respective storage objects in the hierarchy;

determine whether or not a dependency exists between the first storage object and the second storage object;

having determined that a dependency exists between the first storage object and the second storage object;

initiate a first asynchronous recovery operation and a second asynchronous recovery operation on the first storage object and the second storage object, respectively, in accordance with the obtained order in which the respective storage objects in the hierarchy are to be recovered;

monitor the status of the first storage object upon completion of the first asynchronous recovery operation; and in response to detecting a nominal status of the first storage object, initiate the second asynchronous recovery operation on the second storage object; and having determined that a dependency does not exist between the first storage object and the second storage object, initiate concurrent asynchronous recovery operations on the first storage object and the second storage object.

2. The system of claim 1 wherein the storage processor is further configured to:

determine the first asynchronous recovery operation based on one or more of a status of the first storage object, a type of the first storage object, and the dependency between the first storage object and the second storage object; and determine the second asynchronous recovery operation based on one or more of a status of the second storage object, a type of the second storage object, and the dependency between the first storage object and the second storage object.

3. The system of claim 2 wherein the identified storage objects further include a third storage object, wherein the obtained order includes the second storage object followed by a third storage object, and wherein the storage processor is further configured to:

monitor the status of the second storage object upon completion of the second asynchronous recovery operation; and in response to detecting a nominal status of the second storage object, initiate a third asynchronous recovery operation on the third storage object.

4. The system of claim 1 wherein the asynchronous recovery operations execute asynchronously from one or more of a boot process of the storage processor, a hot plug process of the storage processor, and a discovery process of the storage processor.

5. The system of claim 1 wherein the storage processor executes one or more of a boot process, a hot plug process, and a discovery process in the first state.

6. The system of claim 1 wherein the storage processor is further configured, having determined that a dependency does not exist between the first storage object and the second storage object, to determine that the first storage object and the second storage object are at a same level of the hierarchy.

7. The system of claim 1 wherein the storage system processor is a virtual machine.

8. The system of claim 1 wherein the storage processor is further configured to regenerate metadata of one or more of the first storage object and the second storage object during the recovery process.

9. The system of claim 1 wherein the plurality of storage objects comprises data related to one or more of a file share, a file system, a virtual volume, a snapshot, a logical unit number (LUN), a mapped LUN, and a storage pool.

10. A computer-implemented method executed on a storage processor of a storage system for automatically identifying and recovering storage objects, the method comprising the steps of:

initiating, by the storage processor, a recovery process for a storage object in response to a first state of the storage processor;

determining, by the storage processor, a status for each of a plurality of storage objects associated with storage resources in communication with the storage system;

identifying, by the storage processor, storage objects from among the plurality of storage objects as requiring recovery based on the status of each of the plurality of storage objects, the identified storage objects including at least a first storage object and a second storage object;

determining a hierarchy of at least some of the identified storage objects to obtain an order in which respective storage objects in the hierarchy are to be recovered, the hierarchy being based on one or more dependencies between the respective storage objects in the hierarchy;

determining, by the storage processor, whether or not a dependency exists between the first storage object and the second storage object;

having determined that a dependency exists between the first storage object and the second storage object;

initiating a first asynchronous recovery operation and a second asynchronous recovery operation on the first storage object and the second storage object, respectively, in accordance with the obtained order in which the respective storage objects in the hierarchy are to be recovered;

monitoring the status of the first storage object upon completion of the first asynchronous recovery operation; and in response to detecting a nominal status of the first storage object, initiating the second asynchronous recovery operation on the second storage object; and having determined that a dependency does not exist between the first storage object and the second storage object, initiating, by the storage processor, concurrent asynchronous recovery operations on the first storage object and the second storage object.

11. The computer-implemented method of claim 10 further comprising:

determining, by the storage processor, the first asynchronous recovery operation based on one or more of a status of the first storage object, a type of the first storage object, and the dependency between the first storage object and the second storage object; and determining, by the storage processor, the second asynchronous recovery operation based on one or more of a status of the second storage object, a type of the second storage object, and the dependency between the first storage object and the second storage object.

12. The computer-implemented method of claim 10 wherein the identified storage objects further include a third storage object, wherein the obtained order includes the second storage object followed by a third storage object, and wherein the method further comprises:
    monitoring by the storage processor, the status of the second storage object upon completion of the second asynchronous recovery operation; and
    in response to detecting a nominal status of the second storage object, initiating, by the storage processor, a third asynchronous recovery operation on the third storage object.

13. The computer-implemented method of claim 10 wherein the asynchronous recovery operations execute asynchronously from one or more of a boot process of the storage system processor, a hot plug process of the storage system processor, and a discovery process of storage system processor.

14. The computer-implemented method of claim 10 wherein the storage processor executes one or more of a boot process, a hot plug process, and a discovery process in the first state.

15. The computer-implemented method of claim 10 further comprising, having determined that a dependency does not exist between the first storage object and the second storage object, determining that the first storage object and the second storage object are at a same level of the hierarchy.

16. The computer-implemented method of claim 10 wherein the storage system processor is a virtual machine.

17. The computer-implemented method of claim 10 further comprising causing the storage system processor to regenerate metadata of one or more of the first storage object and the second storage object during the recovery process.

18. The computer-implemented method of claim 10 wherein the plurality of storage objects comprises data related to one or more of a file share, a file system, a virtual volume, a snapshot, a logical unit number (LUN), a mapped LUN, and a storage pool.

19. The computer-implemented method of claim 10 wherein determining the status for each of the plurality of storage objects includes:
    identifying each of storage pools, logical units of storage (LUNs), lower deck file systems, and upper deck file systems as storage objects having status.

20. The computer-implemented method of claim 19 wherein determining the hierarchy includes:
    prioritizing the hierarchy,
    wherein prioritizing the hierarchy includes prioritizing storage pools higher than LUNs, LUNs higher than lower deck file systems, and lower deck file systems higher than upper deck file systems.

21. A storage system comprising:
    a plurality of storage objects associated with storage resources in communication with the storage system; and
    processing circuitry configured to:
        identify storage objects from among the plurality of storage objects as requiring recovery based on a status of each of the plurality of storage objects, the identified storage objects including at least a first storage object and a second storage object;
        determine whether or not a dependency exists between the first storage object and the second storage object;
        if a dependency exists between the first storage object and the second storage object:
            determine a hierarchy of the first storage object and the second storage object based on the dependency between the first storage object and the second storage object;
            obtain, from the determined hierarchy, an order in which the first storage object and the second storage object are to be recovered; and
            initiate sequential asynchronous recovery operations on the first storage object and the second storage object based on the obtained order; and
        if a depedency does not exist between the first storage object and the second storage object, initiate concurrent asynchronous recovery operations on the first storage object and the second storage object.

22. The system of claim 21 wherein the processing circuitry is further configured to implement a recovery agent to recover a respective one of the first storage object and the second storage object, and wherein the recovery agent is configured to:
    run a recovery session for performing a respective one of the sequential or concurrent asynchronous recovery operations;
    before beginning the respective one of the sequential or concurrent asynchronous recovery operations, acquire a cluster lock; and
    upon acquisition of the cluster lock, write to a process identifier (PID) file to indicate that the recovery session is running.

23. The system of claim 22 wherein the recovery agent is further configured to:
    write, to an info file, data that describes the respective one of the first storage object and the second storage object to be recovered and indicates that the recovery session is run by the recovery agent.

24. The system of claim 23 wherein the processing circuitry is further configured to remove the PID file upon termination of the recovery session, and wherein the recovery agent is further configured to:
    determine that the PID file has been removed;
    determine that the info file exists; and
    having determined that the PID file has been removed but the info file exists, resume the running of the recovery session to complete the performing of the respective one of the sequential or concurrent asynchronous recovery operations.

* * * * *